United States Patent
Hall

(10) Patent No.: US 9,747,084 B2
(45) Date of Patent: Aug. 29, 2017

(54) OFFLINE SHADER COMPILATION

(71) Applicant: Google Inc., Mountain View, CA (US)

(72) Inventor: Jesse David Hall, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 12 days.

(21) Appl. No.: 14/839,059

(22) Filed: Aug. 28, 2015

(65) Prior Publication Data

US 2016/0070549 A1    Mar. 10, 2016

Related U.S. Application Data

(60) Provisional application No. 62/048,131, filed on Sep. 9, 2014.

(51) Int. Cl.
  *G06F 9/44*  (2006.01)
  *G06F 9/45*  (2006.01)
  *G06F 9/445* (2006.01)
  *G06T 1/20*  (2006.01)

(52) U.S. Cl.
  CPC ............ *G06F 8/41* (2013.01); *G06F 8/61* (2013.01); *G06F 8/71* (2013.01); *G06T 1/20* (2013.01)

(58) Field of Classification Search
  CPC ..... G06F 8/41; G06F 8/61; G06F 8/71; G06T 1/20
  See application file for complete search history.

(56) References Cited

U.S. PATENT DOCUMENTS

| | | | | |
|---|---|---|---|---|
| 7,750,913 B1 * | 7/2010 | Parenteau | ............... | G06F 8/30 345/426 |
| 2003/0204819 A1 * | 10/2003 | Matsumoto | ......... | G06F 17/5045 716/102 |
| 2006/0174233 A1 * | 8/2006 | Minadakis | ............... | G06F 8/41 717/140 |
| 2007/0076010 A1 * | 4/2007 | Swamy | ............... | G06F 9/4425 345/565 |
| 2008/0059956 A1 * | 3/2008 | Su | ............. | G06F 8/41 717/140 |
| 2009/0089763 A1 * | 4/2009 | Chen | ......... | G06F 8/41 717/140 |
| 2009/0113402 A1 * | 4/2009 | Chen | ......... | G06F 8/41 717/140 |

(Continued)

OTHER PUBLICATIONS

Brian Peek, Fall Fury: Part 2—Shaders, https://channel9.msdn.com/coding4fun/articles/Fall-Fury-Part-2-Shaders, Jan. 23, 2013, pp. 1-27.*

(Continued)

*Primary Examiner* — Thuy Dao
*Assistant Examiner* — Mongbao Nguyen
(74) *Attorney, Agent, or Firm* — Morris & Kamlay LLP

(57) ABSTRACT

Systems and techniques are provided that allow for installation of an application on a mobile device using a shader executable suitable for execution by the mobile device. When a request to install an application is received by an application distribution platform, a shader configured for the device is generated by the platform and provided with the application package for installation on the device. Thus, launch-time compilation and just-in-time re-compilation may be avoided.

19 Claims, 3 Drawing Sheets

(56) References Cited

U.S. PATENT DOCUMENTS

| | | | | |
|---|---|---|---|---|
| 2010/0218176 | A1* | 8/2010 | Spanner | G06F 11/368 717/170 |
| 2013/0007712 | A1* | 1/2013 | Agarwal | G06F 8/41 717/124 |
| 2013/0227521 | A1* | 8/2013 | Bourd | G06F 11/3604 717/110 |
| 2013/0229414 | A1* | 9/2013 | Gruber | G06T 15/40 345/426 |
| 2013/0305234 | A1* | 11/2013 | Marathe | G06F 9/44521 717/162 |
| 2014/0033219 | A1* | 1/2014 | Gao | G06F 9/50 718/104 |
| 2014/0258996 | A1* | 9/2014 | Brackman | G06F 8/443 717/151 |
| 2014/0258997 | A1* | 9/2014 | Lim | G06F 8/443 717/151 |
| 2014/0337465 | A1* | 11/2014 | Everitt | H04L 67/2804 709/217 |
| 2014/0354669 | A1* | 12/2014 | Galazin | G06T 11/001 345/582 |
| 2014/0357357 | A1* | 12/2014 | Boyd | A63F 13/00 463/31 |
| 2015/0022541 | A1* | 1/2015 | Zelsnack | G06F 8/443 345/589 |
| 2015/0070367 | A1* | 3/2015 | Fam | G06T 1/20 345/522 |
| 2015/0178974 | A1* | 6/2015 | Goel | G06T 1/20 345/420 |
| 2015/0186167 | A1* | 7/2015 | Jennings | G06F 9/45504 717/148 |
| 2015/0347108 | A1* | 12/2015 | Munshi | G06F 8/41 717/146 |

OTHER PUBLICATIONS

Jason Mitchell, DirectX 9 High Level Shading Language, Excerpted from Introduction to the Direct X 9 High Level Shading Language in the book ShaderX—Introduction and Tutorials with DirectX 9.0, 2012, pp. 1-18.*

Randi J. Rost, OpenGL Shading Language, Second Edition, Addision Wesley Professional, Jan. 25, 2006, pp. 36-42 and 72-80.*

* cited by examiner

US 9,747,084 B2

OFFLINE SHADER COMPILATION

PRIORITY

This application claims the benefit of U.S. Provisional Application No. 62/048,131, filed Sep. 9, 2014, the disclosure of which is incorporated by reference in its entirety.

BACKGROUND

In graphics-related application programming interfaces (APIs), applications may provide small programs called shaders that perform operations such as inner-loop computations on graphics-specific hardware, such as graphics processing units (GPUs). As shader instruction sets may vary significantly between GPUs, the shader source code may be provided to the driver at runtime. The driver may then compile source code instructions into a hardware-specific executable. Depending on the hardware architecture, the hardware executable also may depend the graphics API state, so the driver may create multiple executables for the shader on-demand as the shader is used with different state combinations.

BRIEF SUMMARY

According to an implementation of the disclosed subject matter, a request to install an application on a mobile device may be received. A compiler associated with a configuration of the mobile device may be identified, for example based upon information obtained from the mobile device or otherwise available that describes the mobile device. A mobile device configuration may include, for example, an indication of a driver or driver version available on the device, an indication of hardware or a hardware version available on the device, or the like. Shader source code, state information, and/or other information may be obtained from an application package of the application, and used to compile a shader executable suitable for execution on the mobile device. A primary application package and an auxiliary application package that includes the shader executable then may be provided to the mobile device, the auxiliary application package comprising the shader executable. The shader executable may be configured to perform each shader operation required by the application during execution of the application on the mobile device. The shader source code and the state information from the application package may include pipeline configuration files, which may serve as inputs to the compiler. The auxiliary application package may be cached and, for example, identified as being associated with the application and the mobile device configuration.

In an implementation, an application distribution platform may include a computer-readable storage that stores application packages, each of which is associated with an application, and software compilers. The platform may include a processor configured to receive a request to install one of the applications on a mobile device and identify one of the compilers based upon a configuration of the mobile device. Shader source code and state information may be obtained from one of the application packages based upon the application for which the request was received. The processor may compile the shader source code using the compiler and the state information to generate a shader executable for the mobile device. The primary application package and an auxiliary application package including the shader may be provided to the mobile device.

In an implementation, an application package may be received by an application distribution platform that includes one or more shader compiler inputs. Pipeline configuration files also may be received, which include references to the one or more shader compiler inputs. A shader compiler, for a first device version, may be obtained by the application distribution platform. The device version may be based upon, for example, an SKU, GUID, device software or operating system version, or the like. The platform may determine that a device version of a user device is the first device version. The pipeline configuration files may be extracted and provided as inputs to the shader compiler, which then may generate a compiled output based on the provided pipeline configuration files. An auxiliary application package may be generated based on the compiled output of the shader compiler and provided to the user device.

According to an embodiment of the disclosed subject matter, means for generating applications are provided, which may include means for receiving a request to install an application on a mobile device; means for identifying a compiler associated with a configuration of the mobile device; means for obtaining shader source code and/or state information; means for compiling the shader source code; and means for providing primary and auxiliary application packages to the mobile device.

Implementations of the disclosed subject matter may allow for more efficient graphical display on mobile devices, and avoid conventional requirements to compile and/or recompile binary shader executable files during execution of an application. Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
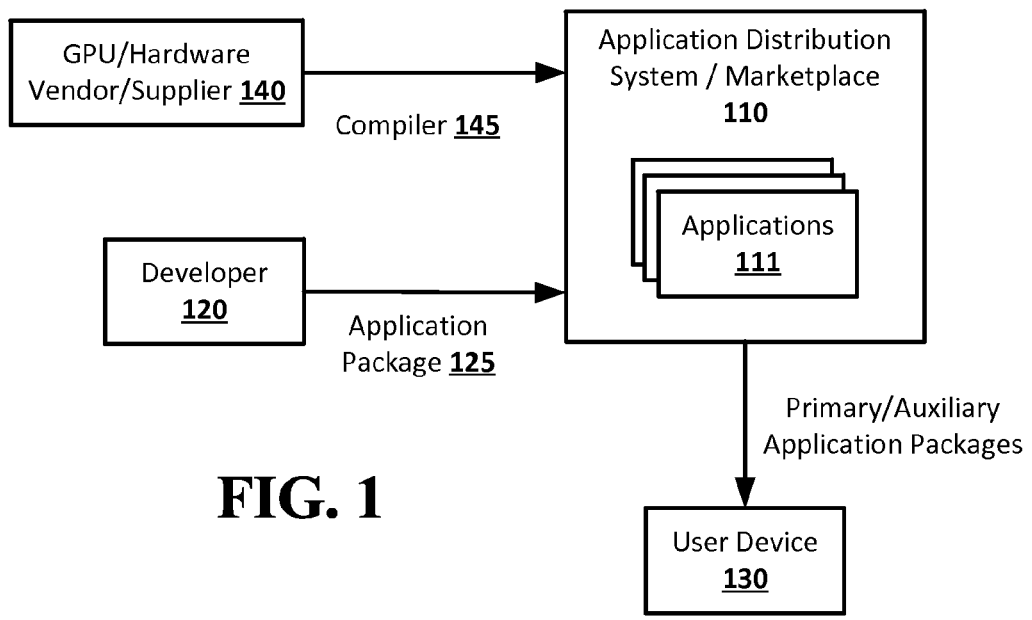
FIG. 1 shows an example application distribution system and related devices as disclosed herein.

As shaders get larger and more complex, the conventional process of runtime compilation may cause relatively very long application launch times, level load times, or the like. State-dependent re-compilation also may cause relatively long and unpredictable pauses or other interruptions if the compilation causes individual frame rendering to take too long.

On dedicated devices such as game consoles, applications may only need to use a single specific GPU architecture. In such a situation, compilation may be performed offline, i.e., not on-demand during operation of the application by a user. For example, compilation may be performed when the game is initially programmed, and the executables then may be distributed with the rest of the game assets. While such a technique may address undesirable load times and recompile problems, it isn't reasonably scalable to mainstream consumer computing platforms that support a variety of graphics architectures. For example, mobile ecosystems may include a wide variety of hardware types and configurations, each of which may have slightly or dramatically different hardware graphics capabilities. Thus, pre-compilation as used with a known console hardware configuration may be unsuitable for such an ecosystem.

In some cases, shader source code may be converted into one or more binary hardware-agnostic intermediate forms, which can then be cached and/or optimized for a specific hardware configuration. This approach may reduce compilation time when an application is initially executed (launched), but typically does not reduce in-game load times. It also does not prevent or eliminate the need for recompilation during execution of the application.

Another approach is to provide a mechanism for a binary form of a shader to be provided by the driver, so that the application can cache the binary shader between launches of an application. However, such a technique is complex and typically implemented inconsistently by different hardware drivers, if at all. For example, some drivers may provide a binary intermediate form as previously discussed; others may provide a binary that includes state-dependent hardware executables generated from the shader to that point. This may be sufficient for caching shaders on a device an application is first executed, but does not address the first-launch experience of the user, which may be critical in setting the user's expectations and initial impression of the application. Further, each application is then required to manage the cache of binaries, which can lead to a dramatic increase in application complexity for an unknown degree of benefit, in view of inconsistent implementation by different drivers.

The difficulties involved in implementing shaders for various hardware configurations may be particularly relevant within a mobile application ecosystem, such as where an application marketplace or similar distribution system provides applications to multiple devices such as smartphones, tablets, and other mobile devices. It may be desirable for such a marketplace to provide the same or equivalent applications to a wide variety of hardware devices, which may have very different configurations and capabilities.

Implementations of the presently disclosed subject matter provide cloud-based, client-server based, and/or similar application distribution systems with techniques and systems that simplify the process of providing appropriate shaders to a variety of hardware configurations, thus improving the operation of graphically-intensive applications on devices that operate within the distribution system. Techniques and systems disclosed herein also may improve the efficiency of graphic processing and rendering by devices that execute applications provided by the distribution system. They also may improve the actual and/or apparent capabilities of such a device, by improving the user experience upon launch and intermediate load sequences within specific applications.

In general, systems and techniques disclosed herein may provide a device with a compiled auxiliary application package for an application. FIG. 1 shows an example application distribution system and related devices as disclosed herein. A distribution system 110, such as an application marketplace, may provide applications 111 to user devices 130. The distribution system 110 may be, for example, a server and/or a cloud-based distribution system. The general operation of such a distribution system in providing applications via a wired and/or wireless communications link to user devices (e.g., a user device 130 may be a smart phone, a tablet computer, laptop computer, desktop computer, or the like) is understood in the art. For example, each application 111 may have various versions that are designed for use on a type of device, an operating system version, or the like. The distribution system 110 may provide the appropriate version of the application 111 to a specific device 130 upon receiving a request from the device 130. The device may be linked to one or more user accounts that are managed by the distribution system 110, thus allowing applications to be provided to individual users regardless of the specific device (e.g., user device 130) used to access the distribution system 110.

An application developer 120 may provide one or more application packages 125 to the distribution system 110. The application developer 120 may be, for example, any suitable computing device, and the one or more application packages 125 may be programs, applications, and/or data. An application package typically includes the computer-executable instructions and other assets that are required to implement a specific application 111 on a user device. For example, an application package 125 may include executable instructions, recorded music, graphics, and the like that are required to implement a game application on a user device (e.g., user device 130).

According to implementations of the present disclosure, an application package 125 provided to the distribution system 110 also may include contains shader source and a machine-readable representation of the various state combinations with which the state will be used. In addition, a GPU vendor, device manufacturer, or other similar entity 140 may provide a compiler executable 145 for or more device configurations. That is, the vendor 140 may include a server and/or other suitable computing device to generate and/or provide the compiler executable 145 to the distribution system 110. Generally, a device configuration may refer to a specific combination of a device and a driver version, though other configuration parameters may be used to define different device configurations as well. Multiple compilers may be provided. For example, a GPU vendor may provide a set of compiler executables for each combination of device and driver version currently supported by the vendor. In some cases a single executable may apply to multiple device/driver combinations.

When a user requests an application (e.g., application package 125) from the distribution system 110, such as by indicating that the application should be installed on a device 130, the distribution system 110 may provide an application package 125 that includes a pre-compiled shader executable. For example, the shader executable may be generated based on the shader source, state combinations, and other information provided by the hardware vendor 140 or similar entity to the application distribution system 110. The shader executable may be provided as part of the application package 125 delivered to the user device 130, or it may be provided as an auxiliary or secondary application package. For example, the distribution system 110 may provide a main application package to each device or each device of a certain type that requests the application (e.g., the user device 130). When the distribution system has sufficient shader source code and other information to generate a shader executable, the shader executable may be provided as an auxiliary application package. The main application package may be configured to operate on a client device regardless of whether an auxiliary application package is present, but to use the shader executable when an auxiliary package is present.

Figure 2:
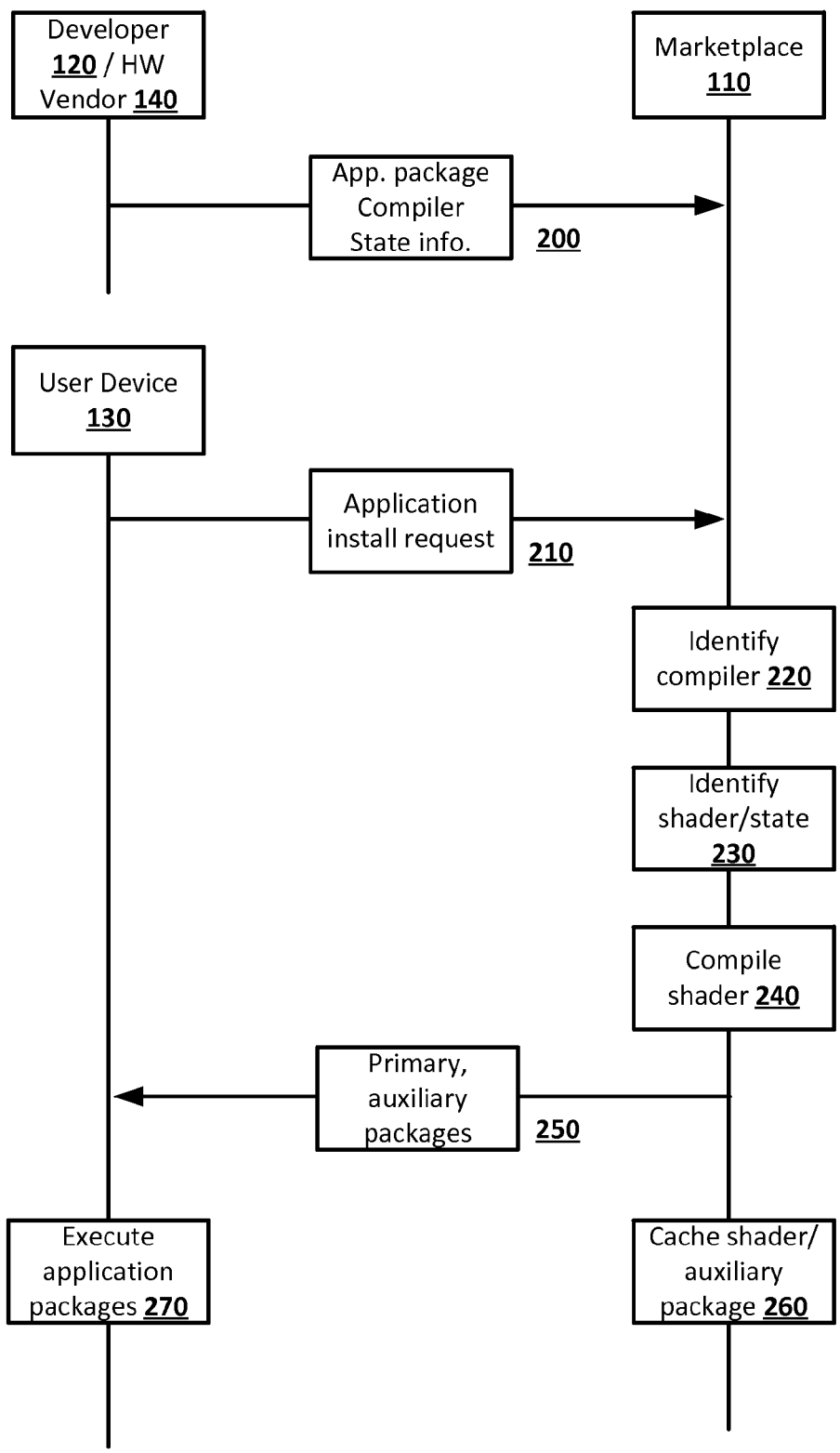
FIG. 2 shows an example process according to implementations disclosed herein.

FIG. 2 shows an example process according to implementations disclosed herein in further detail. As previously described, at 200, shader source code, state combinations, one or more compilers, and related shader and/or hardware information may be provided to an application distribution system (e.g., application distribution system 110 shown in FIG. 1), such as by a developer (e.g., developer 120 shown in FIG. 1) and/or hardware provider (e.g., hardware vendor 140 shown in FIG. 1). When a device (e.g. user device 130 shown in FIG. 1) requests installation of an application at 210, the distribution system may identify a compiler at 220 that is indicated as being appropriate to the combination of device or device type, and driver version. The device/driver combination may be determined based on a device serial number, device stock-keeping unit (SKU) number, installed software version, or the like, or various combinations thereof. The combination may be determined based only on hardware or software information, such as the type of GPU or the operating system version, respectively, or on a combination of hardware and software information.

After identifying an appropriate compiler, at 230 the distribution system (e.g., distribution system 110) may identify the defined combinations of shader and state information provided by a developer of the application. For example, the shader/state combination information may be extracted from an initial application package (e.g., application package 125) provided by the application developer (e.g., developer 120). As described in further detail below, in some cases the developer may provide the application package in a predefined format or including specific components to allow the distribution system to efficiently extract the shader and state information from the application package.

At 240 the shader source and state information may be provided to the compiler selected at 220 to generate a shader executable for inclusion in an auxiliary application package. For example, a portion of the auxiliary application package may be generated by compiling the shader source code with the selected compiler, for one or more of the states defined by the state information. Thus, the auxiliary application package may include one or more pre-compiled executable shaders suitable for execution on the device that made the initial request at 210.

At 250, the distribution system may provide a primary application package and the auxiliary application package to the requesting device. The packages may be installed together as single application, separately, or as a primary application and an auxiliary application or other resource, which may or may not be visible to the user. For example, the primary application package may be the same or essentially the same regardless of the device or the type of device that requested installation of the application at 210, and may be configured to operate as a conventional application from the perspective of the user. The auxiliary application package may be installed on the device and made available to the primary application once installed, and may not be presented to the user separately as a second application package.

At 260, the application distribution system may cache the generated auxiliary application package, and may store an indication of the device, driver, and application so that it need not be re-generated if a request is received from a matching device. That is, the distribution system may cache auxiliary application packages based upon device, driver, and/or application combinations, to avoid recompiling auxiliary application packages on every application install.

At 270, at runtime on the device, the application can load the shader executables if present and provide them to the driver. If not available, it can provide the shader source as it would in the absence of the auxiliary application package. For example, the application may check the auxiliary package for complied data prior to compiling any component. If the auxiliary package contains the complied data, then the application may use the complied data in the auxiliary package; otherwise the application may compile whatever portions of the shader are not available in the auxiliary package. Such a configuration may avoid both compilation at load time, even in the first launch of the application, as well as just-in-time recompiles.

As previously described, an application package provided by an application developer may include shader source and/or state information that can be used to generate a shader executable for a device on which the application is to be installed. For example, the application package may include one or more shader compiler inputs and pipeline configuration files. A pipeline configuration file may correspond to a single stage in a multistage process that makes up a model graphic API that is used by an application to compile the graphical interface for the application. A pipeline configuration file may reference one or more shader compiler inputs. Thus, as a compiler compiles a particular application package, the compiler steps through the pipeline configuration files and calls one or more of the shader compiler inputs. Different pipeline configuration files may be used with different shaders or different shader types. For example, different pipeline configuration files may be used for vertex shaders and pixel shaders. The output of one pipeline file may become the input for a subsequent pipeline configuration file, thus allowing for construction of complex shading operations.

Shader files may be, for example, text files that contain shader sources in a language acceptable for a graphics API of a platform. Additionally, a developer may provide pipeline configuration files that reference the shader files (e.g., vertex, pixel, etc.) as well as state information (e.g., state binary values). The pipeline configuration files in conjunction with the shader files and state information may enable a complier to compile aspects of the developer's application. An example of a pipeline file for a blend operation may be expressed as the following, with capitalized terms corresponding to states:
// src: incoming RGBA color from pixel shader
// dst: current RGBA color in buffer
// result: new RGBA color in buffer
result=(SRC_FACTOR*src) <BLEND_OP> (DST_FACTOR*dst)

A pipeline configuration file may be generated based on the shader compiler inputs and the states. Specific, non-limiting examples of pipeline configuration files are provided below:

```xml
0.xml:
<pipeline>
    <shaders>
        <vertex file="shader1.vert">
        <fragment file="shader2.frag">
    </shaders>
    <state>
        <blend op="ADD" srcfactor="ONE" dstfactor="ZERO" />
        ...
    </state>
</pipeline>
1.xml:
<pipeline>
    <shaders>
        <vertex file="shader1.vert">
        <fragment file="shader2.frag">
    </shaders>
    <state>
        <blend op="ADD" srcfactor="ONE" dstfactor="ONEMINUS_SRC_ALPHA" />
        ...
    </state>
</pipeline>
2.xml:
<pipeline>
    <shaders>
        <vertex file="shader1.vert">
        <fragment file="shader3.frag">
    </shaders>
    <state>
        <blend op="ADD" srcfactor="ONE" dstfactor="ZERO" />
        ...
    </state>
</pipeline>
```

As previously described with respect to FIG. 2, an application distribution system (e.g., application distribution system 110 shown in FIG. 1) may determine a device version of the user device (e.g., user device 130 shown in FIG. 1), and a shader compiler may be identified based on the device version. In operation, the pipeline configuration files then may be extracted from the application package (e.g., application package 125 shown in FIG. 1) and provided to the shader compiler corresponding to the user device's compiler. When constructing the compiled shader executable, the shader compiler may receive the pipeline configuration files from the application package provided by the developer in a predetermined order (e.g., first to last order), such that all the pipeline configuration files and passed through the compiler. However, a given shader complier may not utilize all available pipeline configuration files. The compiled auxiliary application package may be generated based on the compiled output of the shader compiler, as previously described.

Notably, systems and techniques disclosed herein may allow for relatively fast load-times, including at first launch, of applications, and also may prevent recompilation during execution across many GPU architectures and driver versions. These benefits may be obtained even for architectures, device configurations, and the like that are not available when the application is first developed and shipped, since the relevant shader compilation and configuration can be performed at a point later in time, without requiring specific updates to existing applications. Implementations disclosed herein also may leverage cloud-scale computation, by performing rapid calculation of shader/state combinations in parallel on many high-performance processors, rather than a single mobile processor as would otherwise be required. Thus, relatively low-powered mobile devices may benefit from the relatively higher computation resources available to a cloud-based or similar application distribution system.

Figure 3:
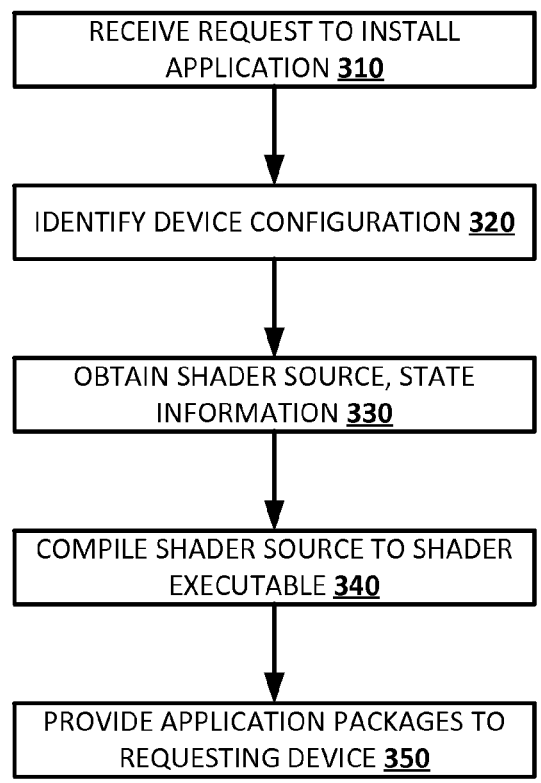
FIG. 3 shows an example process according to implementations disclosed herein.

FIG. 3 shows an example process according to implementations disclosed herein. At 310, a request to install an application on a mobile device (e.g., user device 130 shown in FIG. 1) may be received, such as a by a cloud-based application distribution platform or similar system (e.g., distribution system 110 shown in FIG. 1). At 320, a compiler (e.g., compiler 145 shown in FIG. 1) associated with a configuration of the mobile device may be identified. The compiler may be stored by the distribution platform (e.g., distribution system 110 shown in FIG. 10, and may have been previously provided by a hardware vendor (e.g., hardware vendor 140 shown in FIG. 1) or similar entity as disclosed herein. At 330, shader source code and state information may be obtained from an application package (e.g., application package 125 shown in FIG. 1) of the application. For example, the source code and/or state information may be obtained from an application package stored at the distribution platform and previously provided by a developer of the application, as disclosed herein. The shader source code may be compiled at 340 using the compiler and the state information to generate a shader executable for the mobile device. A primary application package and an auxiliary application package may be provided to the mobile device at 350. As disclosed herein, the auxiliary application package may include the shader executable. During execution of the application by the mobile device, the auxiliary application package may provide shader operations that otherwise would be compiled during execution of the application. That is, all shader operations required by the application executing on the device may be provided by the shader executable provided in the auxiliary application package.

Figure 4:
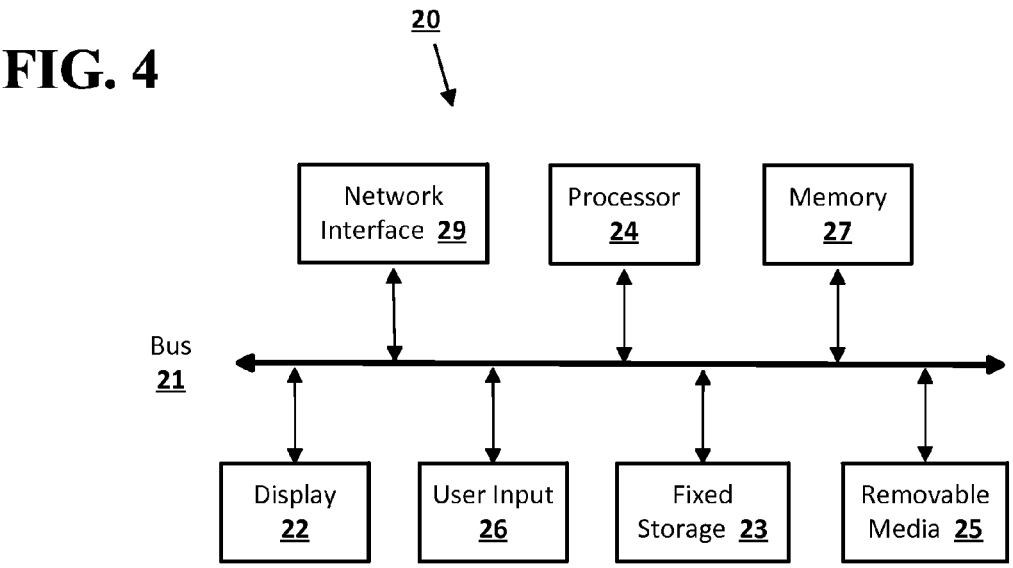
FIG. 4 shows an example computing device as disclosed herein.

The presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth™, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
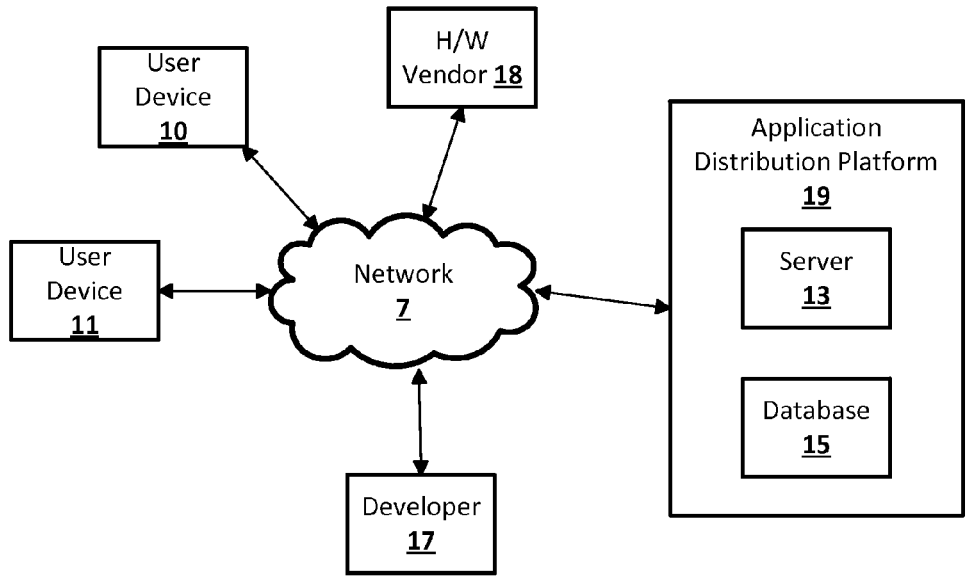
FIG. 5 shows an example communication network as disclosed herein.

FIG. 5 shows an example network arrangement according to an embodiment of the disclosed subject matter. One or more user devices 10, 11, such as smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote systems, such as an application distribution platform 19. Each remote system may include one or more computing devices such as servers 13 and/or databases 15, and may be a cloud-based system that includes various arrangements of such devices. Other systems and entities, such as application developers 17, hardware vendors 18, and the like, also may access the application distribution platform 19 as disclosed herein.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    receiving a request to install an application comprising one or more shader compiler inputs on a mobile device;
    receiving a plurality of pipeline configuration files, wherein the pipeline configuration files comprise references to the one or more shader compiler inputs;
    identifying a compiler associated with a configuration of the mobile device;
    extracting the pipeline configuration files;

obtaining shader source code and state information from an application package of the application;

compiling the shader source code using the compiler, the state information, and the extracted pipeline configuration files to generate a shader executable for the mobile device;

providing a primary application package and an auxiliary application package to the mobile device, the auxiliary application package comprising the shader executable;

receiving a request for a compiled first pipeline configuration from the application on the mobile device;

determining that the compiled first pipeline configuration file is not within the auxiliary application package;

compiling a first pipeline configuration file using an on-device compiler; and providing the compiled first pipeline configuration file.

2. The method of claim 1, wherein the shader executable is configured to perform each shader operation required by the application during execution of the application on the mobile device.

3. The method of claim 1, wherein the configuration of the device comprises an indication of a driver available on the device.

4. The method of claim 1, wherein the configuration of the device comprises an indication of a hardware version of the device.

5. The method of claim 1, further comprising obtaining the configuration from the mobile device.

6. The method of claim 1, wherein obtaining the shader source code and the state information from the application package further comprises extracting a plurality of pipeline configuration files from the application package.

7. The method of claim 6, wherein compiling the shader source code further comprises receiving the pipeline configuration files as inputs to the compiler.

8. The method of claim 1, further comprising:
caching, at an application distribution system, the auxiliary application package; and
storing a record associating the auxiliary application package with the application and the configuration of the mobile device.

9. An application distribution platform, comprising:
a computer-readable storage storing:
a plurality of application packages, each application package associated with one of a plurality of applications; and
a plurality of compilers; and
a processor configured to:
receive a request to install one of the plurality of applications comprising one or more shader compiler inputs on a mobile device;
receive a plurality of pipeline configuration files, wherein the pipeline configuration files comprise references to the one or more shader compiler inputs;
identify one of the plurality of compilers based upon a configuration of the mobile device;
extract the pipeline configuration files;
obtain shader source code and state information from one of the plurality of application packages based upon the application for which the request was received;
compile the shader source code using the compiler, the state information, and the extracted pipeline configuration files to generate a shader executable for the mobile device;

provide a primary application package and an auxiliary application package to the mobile device, the auxiliary application package comprising the shader executable;

receive a request for a compiled first pipeline configuration from an application active on the mobile device;

determine that the compiled first pipeline configuration file is not within the auxiliary application package;

compile a first pipeline configuration file using an on-device compiler; and provide the compiled first pipeline configuration file.

10. A method comprising:
receiving an application package comprising one or more shader compiler inputs at an application distribution platform;
receiving a plurality of pipeline configuration files, wherein the pipeline configuration files comprise references to the one or more shader compiler inputs;
receiving a shader compiler, for a first device version, at the application distribution platform;
determining that a device version of a user device is the first device version;
extracting the pipeline configuration files;
providing the extracted pipeline configuration files as inputs to the shader compiler;
receiving a compiled output from the shader compiler based on the provided pipeline configuration files;
generating an auxiliary application package based on the compiled output of the shader compiler; and
providing the application package and the auxiliary application package to the user device;
receiving a request for a compiled first pipeline configuration from an application active on the user device;
determining that the compiled first pipeline configuration file is not within the auxiliary application package;
compiling a first pipeline configuration file using an on-device compiler; and
providing the compiled first pipeline configuration file.

11. The method of claim 10, further comprising:
receiving a request for a compiled first pipeline configuration from an application active on the user device;
determining that the compiled first pipeline configuration file is within the auxiliary application package; and
providing the compiled first pipeline configuration file to the application active on the user device.

12. The method of claim 10, wherein the shader compiler input comprises text in a graphical application programming interface language accepted by the platform.

13. The method of claim 10, wherein the device version is selected based on one or more selected from the group consisting of: a device stock keeping unit, unique identifier, and device software version.

14. The method of claim 10, wherein the extracted pipeline configuration files are provided to the shader compiler in a first to last order.

15. The method of claim 10, wherein the application package further comprises an application code and a data file.

16. The method of claim 10, wherein at least a portion of the application package is machine readable.

17. The method of claim 10, further comprising storing the compiled output at a remote server.

18. The method of claim 17, wherein the remote server is a cloud server.

19. The method of claim 17, further comprising providing the compiled output to a second user device.

* * * * *